US009191605B1

(12) United States Patent
Evans et al.

(10) Patent No.: US 9,191,605 B1
(45) Date of Patent: Nov. 17, 2015

(54) REMOTE MONITORING OF MEDIA CONTENT THAT IS ASSOCIATED WITH RIGHTS MANAGEMENT RESTRICTIONS

(75) Inventors: Gregory Morgan Evans, Raleigh, NC (US); Thomas A. Roberts, Fuquay-Varina, NC (US); Cheryl Adams, Cary, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1009 days.

(21) Appl. No.: 11/690,979

(22) Filed: Mar. 26, 2007

(51) Int. Cl.
| *G06F 21/00* | (2013.01) |
| *H04N 5/44* | (2011.01) |
| *H04N 21/4363* | (2011.01) |
| *H04N 21/41* | (2011.01) |
| *H04N 21/4402* | (2011.01) |

(52) U.S. Cl.
CPC ......... *H04N 5/4403* (2013.01); *H04N 21/4122* (2013.01); *H04N 21/43637* (2013.01); *H04N 21/4402* (2013.01)

(58) Field of Classification Search
CPC .......... H04N 5/4403; H04N 21/43637; H04N 21/4122; H04N 21/4402
See application file for complete search history.

(56) References Cited

U.S. PATENT DOCUMENTS

| 5,613,004 | A | 3/1997 | Cooperman et al. |
| 5,687,236 | A | 11/1997 | Moskowitz et al. |
| 6,141,753 | A | 10/2000 | Zhao et al. |
| 6,389,541 | B1 | 5/2002 | Patterson |
| 6,735,699 | B1 | 5/2004 | Sasaki et al. |
| 6,751,670 | B1 | 6/2004 | Patterson |
| 6,804,779 | B1 | 10/2004 | Carroni et al. |
| 6,980,204 | B1 | 12/2005 | Hawkins et al. |
| 6,987,985 | B2 | 1/2006 | Purkayastha et al. |
| 7,003,131 | B2 | 2/2006 | Watson et al. |
| 7,016,668 | B2 | 3/2006 | Vaidyanathan et al. |
| 7,036,024 | B2 | 4/2006 | Watson |
| 7,065,607 | B2 | 6/2006 | England et al. |
| 7,069,580 | B1 | 6/2006 | Deitz et al. |
| 7,242,766 | B1 | 7/2007 | Lyle |

(Continued)

FOREIGN PATENT DOCUMENTS

| GB | 2 306 869 A | 5/1997 |
| WO | 2005/045647 A2 | 5/2005 |

(Continued)

OTHER PUBLICATIONS

Jim Lyle, "HDCP: what it is and how to use it," Apr. 18, 2002, http://www.edn.com/article/ca209091.html?q=&q=HDCP.

(Continued)

*Primary Examiner* — Fatoumata Traore
*Assistant Examiner* — Carlton Johnson
(74) *Attorney, Agent, or Firm* — Withrow & Terranova, PLLC

(57) ABSTRACT

An interconnect device receives encrypted high quality media content from a protected interface of the source device and decrypts the encrypted high quality media content to recover the high quality media content. For remote monitoring, the decrypted high quality media content is processed to reduce the quality of the high quality media content to generate the reduced quality media content. The reduced quality media content may be generated by further compressing the high quality media content, reducing the resolution of the high quality media content, downscaling the high quality media content or the like. The decrypted high quality media content is also re-encrypted and delivered to the protected media interface of the destination device.

23 Claims, 3 Drawing Sheets

(56) References Cited

U.S. PATENT DOCUMENTS

| | | | |
|---|---|---|---|
| 7,369,677 B2 | 5/2008 | Petrovic et al. | |
| 7,415,617 B2 | 8/2008 | Ginter et al. | |
| 7,562,397 B1 | 7/2009 | Mithal et al. | |
| 7,840,489 B2 | 11/2010 | Candelore | |
| 8,135,947 B1 | 3/2012 | Evans et al. | |
| 8,224,752 B2 | 7/2012 | Read et al. | |
| 2001/0051996 A1 | 12/2001 | Cooper et al. | |
| 2002/0010759 A1 | 1/2002 | Hitson et al. | |
| 2002/0049580 A1 | 4/2002 | Kutaragi et al. | |
| 2002/0054578 A1 | 5/2002 | Zhang et al. | |
| 2002/0061029 A1 | 5/2002 | Dillon | |
| 2002/0104003 A1 | 8/2002 | Iwamura | |
| 2002/0104015 A1 | 8/2002 | Barzilai et al. | |
| 2002/0104099 A1 | 8/2002 | Novak | |
| 2002/0122141 A1 | 9/2002 | Lee | |
| 2002/0129367 A1 | 9/2002 | Devara | |
| 2002/0141578 A1 | 10/2002 | Ripley et al. | |
| 2002/0144267 A1 | 10/2002 | Gutta et al. | |
| 2002/0156842 A1 | 10/2002 | Signes et al. | |
| 2002/0168082 A1 | 11/2002 | Razdan | |
| 2003/0009769 A1 | 1/2003 | Hensgen et al. | |
| 2003/0012403 A1 | 1/2003 | Rhoads et al. | |
| 2003/0050055 A1 | 3/2003 | Ting et al. | |
| 2003/0081580 A1 | 5/2003 | Vaidyanathan et al. | |
| 2003/0084294 A1 | 5/2003 | Aoshima et al. | |
| 2003/0093665 A1 | 5/2003 | Cooper et al. | |
| 2003/0161268 A1 | 8/2003 | Larsson et al. | |
| 2003/0191850 A1 | 10/2003 | Thornton | |
| 2003/0221100 A1 | 11/2003 | Russ et al. | |
| 2004/0008864 A1 | 1/2004 | Watson et al. | |
| 2004/0010692 A1 | 1/2004 | Watson | |
| 2004/0010694 A1 | 1/2004 | Collens et al. | |
| 2004/0030798 A1 | 2/2004 | Andersson et al. | |
| 2004/0042421 A1 | 3/2004 | Mahany | |
| 2004/0070593 A1 | 4/2004 | Neely et al. | |
| 2004/0073916 A1 | 4/2004 | Petrovic et al. | |
| 2004/0083487 A1 | 4/2004 | Collens et al. | |
| 2004/0086122 A1 | 5/2004 | Watson | |
| 2004/0088557 A1 | 5/2004 | Malcolm et al. | |
| 2004/0117824 A1 | 6/2004 | Karaoguz et al. | |
| 2004/0139047 A1 | 7/2004 | Rechsteiner et al. | |
| 2004/0156528 A1 | 8/2004 | Joo et al. | |
| 2004/0187005 A1 | 9/2004 | Molaro | |
| 2004/0248615 A1 | 12/2004 | Purkayastha et al. | |
| 2004/0263941 A1 | 12/2004 | Chen et al. | |
| 2004/0264372 A1 | 12/2004 | Huang | |
| 2005/0008017 A1 | 1/2005 | Dutta et al. | |
| 2005/0034001 A1 | 2/2005 | Pontarelli | |
| 2005/0050103 A1 | 3/2005 | Kesteloot et al. | |
| 2005/0065891 A1 | 3/2005 | Lee et al. | |
| 2005/0081042 A1 | 4/2005 | Venkatesan et al. | |
| 2005/0086069 A1 | 4/2005 | Watson et al. | |
| 2005/0097331 A1 | 5/2005 | Majidimehr et al. | |
| 2005/0108769 A1 | 5/2005 | Arnold et al. | |
| 2005/0120127 A1 | 6/2005 | Bradley et al. | |
| 2005/0123135 A1 | 6/2005 | Hunt et al. | |
| 2005/0125405 A1 | 6/2005 | Watson et al. | |
| 2005/0144468 A1 | 6/2005 | Northcutt et al. | |
| 2005/0169473 A1 | 8/2005 | Candelore | |
| 2005/0182876 A1 | 8/2005 | Kim et al. | |
| 2005/0182989 A1 | 8/2005 | Zarnke et al. | |
| 2005/0183120 A1 | 8/2005 | Jain et al. | |
| 2005/0192987 A1 | 9/2005 | Marsh | |
| 2005/0201726 A1 | 9/2005 | Malcolm et al. | |
| 2005/0204391 A1 | 9/2005 | Hunleth et al. | |
| 2005/0216942 A1 | 9/2005 | Barton | |
| 2005/0220321 A1 | 10/2005 | Langelaar | |
| 2005/0239497 A1 | 10/2005 | Bahl et al. | |
| 2005/0251486 A1 | 11/2005 | Nair | |
| 2005/0251491 A1 | 11/2005 | Medina et al. | |
| 2005/0286438 A1 | 12/2005 | Rajkotia | |
| 2006/0010274 A1 | 1/2006 | Olson | |
| 2006/0015735 A1 | 1/2006 | Kudo et al. | |
| 2006/0048185 A1 | 3/2006 | Alterman | |
| 2006/0048186 A1 | 3/2006 | Alterman | |
| 2006/0050880 A1 | 3/2006 | Taylor et al. | |
| 2006/0053452 A1 | 3/2006 | Lee et al. | |
| 2006/0053472 A1* | 3/2006 | Goto et al. | 725/141 |
| 2006/0056349 A1 | 3/2006 | Nakatagawa et al. | |
| 2006/0059560 A1 | 3/2006 | Montulli | |
| 2006/0072786 A1 | 4/2006 | Watson et al. | |
| 2006/0075243 A1 | 4/2006 | Lakamp et al. | |
| 2006/0085534 A1* | 4/2006 | Ralston et al. | 709/223 |
| 2006/0085830 A1 | 4/2006 | Bruck et al. | |
| 2006/0095401 A1 | 5/2006 | Krikorian et al. | |
| 2006/0095471 A1 | 5/2006 | Krikorian et al. | |
| 2006/0095472 A1 | 5/2006 | Krikorian et al. | |
| 2006/0095792 A1 | 5/2006 | Hurtado et al. | |
| 2006/0123235 A1 | 6/2006 | Vanstone | |
| 2006/0126888 A1 | 6/2006 | Talstra et al. | |
| 2006/0127037 A1 | 6/2006 | Van Hoff et al. | |
| 2006/0133644 A1 | 6/2006 | Wells et al. | |
| 2006/0156003 A1 | 7/2006 | Zhang et al. | |
| 2006/0156416 A1 | 7/2006 | Huotari et al. | |
| 2006/0158968 A1 | 7/2006 | Vanman et al. | |
| 2006/0161776 A1 | 7/2006 | Van Der Veen et al. | |
| 2006/0173794 A1 | 8/2006 | Sellars et al. | |
| 2006/0174128 A1 | 8/2006 | Yuval | |
| 2006/0193492 A1 | 8/2006 | Kuzmich et al. | |
| 2006/0200416 A1 | 9/2006 | White et al. | |
| 2006/0232449 A1 | 10/2006 | Jain et al. | |
| 2006/0282676 A1 | 12/2006 | Serret-Avila et al. | |
| 2007/0056046 A1 | 3/2007 | Claudatos et al. | |
| 2007/0100771 A1 | 5/2007 | Eckleder et al. | |
| 2007/0124474 A1* | 5/2007 | Margulis | 709/226 |
| 2007/0130585 A1* | 6/2007 | Perret et al. | 725/46 |
| 2007/0133673 A1 | 6/2007 | Imaizumi | |
| 2007/0269044 A1 | 11/2007 | Bruestle et al. | |
| 2007/0294738 A1 | 12/2007 | Kuo et al. | |
| 2008/0005676 A1 | 1/2008 | Evans et al. | |
| 2008/0044087 A1 | 2/2008 | Levy et al. | |
| 2008/0148063 A1* | 6/2008 | Hanko et al. | 713/189 |
| 2009/0037388 A1 | 2/2009 | Cooper et al. | |
| 2009/0287837 A1 | 11/2009 | Felsher | |
| 2009/0287940 A1 | 11/2009 | Carr | |

FOREIGN PATENT DOCUMENTS

| | | | |
|---|---|---|---|
| WO | 2006056099 A2 | 5/2006 | |
| WO | 20060446099 A3 | 5/2006 | |

OTHER PUBLICATIONS

MediaMax Axonix Corporation, http://www.axonix.com/mediamax/.

Kaleidescape—Home, http://www.kaleidescape.com.

Get the eye, get PureLink, http://www.dtrovision.com.

Secure KVM over IP: Global-link—Thinklogical, http://www.thinklogical.com/products/globalLink.php.

DVI Extender CAT5, http://www.networktechinc.com/cat5-dvi.html#.

KVM over IP Extender—Logical Solutions, http://www.kvmpro.com/thinklogical-kvm-extnders-dvi-global-link-p-202.html.

KVMPro—KVM Switch, Avocent KVM over IP, http://www.kvmpro.com/dvi-extender-c-38.html.

The DVI CAT5 Extender, (EXT-DVI-CAT5), http://www.kvmpro.com/gefen-kvm-extenders-dvi-the-dvi-cat5-extender-p-214.html.

The DVI 1000 HD (EXT-DVI-1000), http://www.kvmpro.com/gefen-kvm-extenders-dvi-the-dvi-1000-hd-p-213.html.

Remote Access to USB Devices, http://www.networktechinc.com/usb-ip-extender.html.

USB KVM Extender copper CAT5 RJ45, http://www.networktechinc.comlextenders.html.

Global-Link Product Manual Rev. C—Jan. 2005, Logical Solutions, http://www.thinklogical.com/documents/Global-Link_Manual_Rev_C.pdf.

XTENDEX Series ST-C5DVI-150, 150 Foot DVI Video Extender Installation and Operation Manual Software Version 1.2, Oct. 4, 2006, http://www.networktechinc.com/pdf/man063.pdf.

XTENDEX HDTV Extender, http://www.networktechinc.com/pdf/cat-hdtv-extend.pdf.

(56) References Cited

OTHER PUBLICATIONS

"Gefen HDMI Cat-5 Extreme User Manual," Gefen Inc., 2006.
Vijay T. Raisinghani et al., "ECLAIR: An Efficient Cross Layer Architecture for Wireless Protocol Stacks," (article), May 25-28, 2004, 6 pages, 5th World Wireless Congress, San Francisco, CA.
Eric Setton et al., "Cross-Layer Design of Ad Hoc Networks for Real-Time Video Streaming," (article), Aug. 2005, pp. 99-102, vol. 12, issue 4, IEEE Wireless Communications.
No Author, "PC Connection," (website), 2006, 2 pages, http://www.pcconnection.com/ProductDetail?sku=5373172&SourceID=k40132.
Vineet Srivastava et al., "Cross-Layer Design: A Survey and the Road Ahead," (article), Dec. 2005, pp. 112-119, IEEE Communications Magazine.
E. Koch et al., "Towards Robust and Hidden Image Copyright Labeling," (article), Jun. 20-22, 1995, 4 pages, Proc. of 1995 IEEE Workshop on Nonlinear Signal and Image Processing, Neos Marmaras, Greece.
Jana Dittmann et al., "Robust MPEG Video Watermarking Technologies," (article), 1998, pp. 71-80, International Multimedia Conference archive Proceedings of the sixth ACM international conference on Multimedia table of contents, Bristol, United Kingdom, http://www.ipsi.fraunhofer.de/mobile/publications/fullpapers/ACM/acm_ab.doc.
Jiri Fridrich, "Applications of Data Hiding in Digital Images," (article), Nov. 4-6, 1998, 33 pages, Tutorial for the ISPACS '98 Conference in Melbourne, Australia.
Paul Judge et al., "WHIM: Watermarking Multicast Video with a Hierarchy of Intermediaries," (article), 2002, pp. 699-712, vol. 39, issue 6, Computer Networks: The International Journal of Computer and Telecommunications Networking archive.
No Author, "High-bandwidth Digital Content Protection System," Digital Content Production LLC, Revision 1.3, Dec. 21, 2006, pp. 1-20.
No Author, "PureLink Digital Extender User Manual", Dtrovision LLC, 2006, 9 pages.
Degermark, Mikael, et al., "Low-loss TCP/IP Header Compression for Wireless Networks," MOBICOM '96, Proceedings of the Second Annual International Conference on Mobile Computing and Networking, Rye, New York, USA, Nov. 10-12, 1996, ACM 1996, 14 pages.

\* cited by examiner

REMOTE MONITORING OF MEDIA CONTENT THAT IS ASSOCIATED WITH RIGHTS MANAGEMENT RESTRICTIONS

FIELD OF THE INVENTION

The present invention relates to monitoring media content, and in particular to allowing a remote party to monitor media content being provided to a destination device where the media content is subject to rights management restrictions.

BACKGROUND OF THE INVENTION

Parents are often in a battle to control the information provided to their children. Adult content is available through virtually all media outlets, with television and the Internet being the largest culprits. Since parents are unable to constantly be with their children and monitor everything that is being viewed by their children, there is a need for a way for parents to remotely monitor the media content being presented to their children. However, certain measures currently being taken by copyright owners to protect high quality media content will make it virtually impossible for parents to remotely monitor protected media content.

Copyright owners are in a constant battle against piracy of their media content. In the current digital world, high quality copies of digital content can be readily made and distributed without permission of the copyright owners. With the increasing availability of high definition video content and no or low compression audio content, the need to prevent unauthorized copies of audio and video content is greater than ever. In response to these needs, various digital rights management (DRM) techniques have evolved. DRM is a broad term that is used for various techniques used by copyright owners and authorized publishers to control access to and restrict use of media content on associated electronic devices.

High-Bandwidth Digital Content Protection (HDCP) is a form of DRM that was developed by Intel Corporation and is widely used to control the delivery of audio and video media content from one electronic device to another. For HDCP, a source device is able to restrict the playback quality of otherwise high definition media content to DVD (Digital Video Disk) quality, or standard definition, when a destination device does not have an HDCP compliant media interface. Two common HDCP compliant media interfaces include the HDCP compliant High Definition Multimedia Interface (HDMI) and the HDCP compliant Digital Video Interface (DVI). When the destination device does have an HDCP compliant media interface, the high definition media content is generally encrypted by the source device and delivered to the destination device in a secure fashion.

For HDCP, the media interfaces of the respective source and destination devices are able to communicate with each other and play pivotal roles to ensure that the media content is protected. The media interface of the source device will authenticate the media interface of the destination device, and the respective media interfaces will exchange any encryption information to facilitate encryption of the media content by the media interface of the source device and decryption of the encrypted media content by the media interface of the destination device. Notably, this functionality is generally provided in the hardware at the media interfaces and not in the higher level control systems of the respective electronic devices. Other DRM techniques, such as the Advanced Access Content System (AACS), operate in a similar fashion.

The media content that is generally protected by DRM restrictions is high quality media content, such as high definition video and high quality audio, which has little or no compression and is provided at high resolutions. For example, high definition video is lightly compressed and supports resolutions up to 1920 pixels by 1080 pixels or higher, as compared with standard definition video that is 720 pixels by 480 pixels or lower. Notably, high quality media content is generally the only restricted content wherein playback of reduced quality content is generally not restricted.

As such, the high quality media content that is subject to the DRM restrictions is securely passed from one compliant interface at the source device to another compliant interface at the destination device. The DRM restrictions generally prevent access to the high quality media content outside of the source and destination devices, and prevent the high quality media content from being delivered to or from a non-compliant interface of any type of device. Accordingly, the high quality media content that is presented to a destination device, such as display device, cannot be delivered to another device for monitoring, unless the monitoring device has a compliant media interface. In reality, many devices that could be used for remote monitoring will not have a compliant media interface or otherwise be able to comply with the DRM restrictions associated with the high quality video content. Further, the ability to transfer high quality media content to remote devices, especially over a packet-based network, where likely monitoring devices will reside, is generally bandwidth limited.

Accordingly, there is a need for a technique to remotely monitor media content that is being delivered to a destination device, such as a display device. There is a further need for a technique to remotely monitor such media content when the media content is high quality media content that is associated with DRM restrictions. There is yet a further need to remotely monitor such media content over a packet-based network, such as a local area network or wide area network, like the Internet.

SUMMARY OF THE INVENTION

The present invention provides an interconnect device that securely delivers high quality media content that is associated with one or more rights management restrictions from a source device to a destination device, such as a display device, as well as providing reduced quality media content that is generated from the high quality media content for remote monitoring. In operation, the interconnect device receives encrypted high quality media content from a protected interface of the source device and decrypts the encrypted high quality media content to recover the high quality media content. For remote monitoring, the decrypted high quality media content is processed to reduce the quality of the high quality media content to generate reduced quality media content. The reduced quality media content may be generated by further compressing the high quality media content, reducing the resolution of the high quality media content, downscaling the high quality media content, or the like. The decrypted high quality media content is also re-encrypted and delivered to the protected media interface of the destination device. As such, high quality media content is delivered from a protected media interface of the source device to a protected media interface of the destination device in a secure manner, in parallel with generating reduced quality media content from the high quality media content to facilitate remote monitoring.

The reduced quality media content may be delivered from the interconnect device via a wired or wireless communication interface to any number of destination devices, residing on accessible communication networks. The interconnect device can be controlled remotely in response to signals received via the communication interface. A remote party who is monitoring the reduced quality media content can provide instructions to configure and control operation of the interconnect device. For example, the remote party can instruct the interconnect device to prevent delivery of any media content, including the high quality media content, to the destination device in a dynamic fashion. Thus, if the remote party finds the media content being delivered to the destination device objectionable, the remote party can instruct the interconnect device to stop delivering the objectionable media content to the destination device.

The present invention is particularly beneficial when delivering high quality media content that is protected by digital rights management (DRM) restrictions, which require the high quality versions of the media content to be delivered between DRM compliant media interfaces. For example, media content that is protected by High-bandwidth Digital Content Protection (HDCP) can be delivered by the interconnect device between HDCP compliant media interfaces, such as Digital Visual Interfaces (DVIs) and High Definition Multimedia Interfaces (HDMIs), of the source and destination devices without violating HDCP's DRM restrictions. At the same time, the interconnect device is able to generate reduced quality media content for remote monitoring while abiding by the HDCP requirements.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
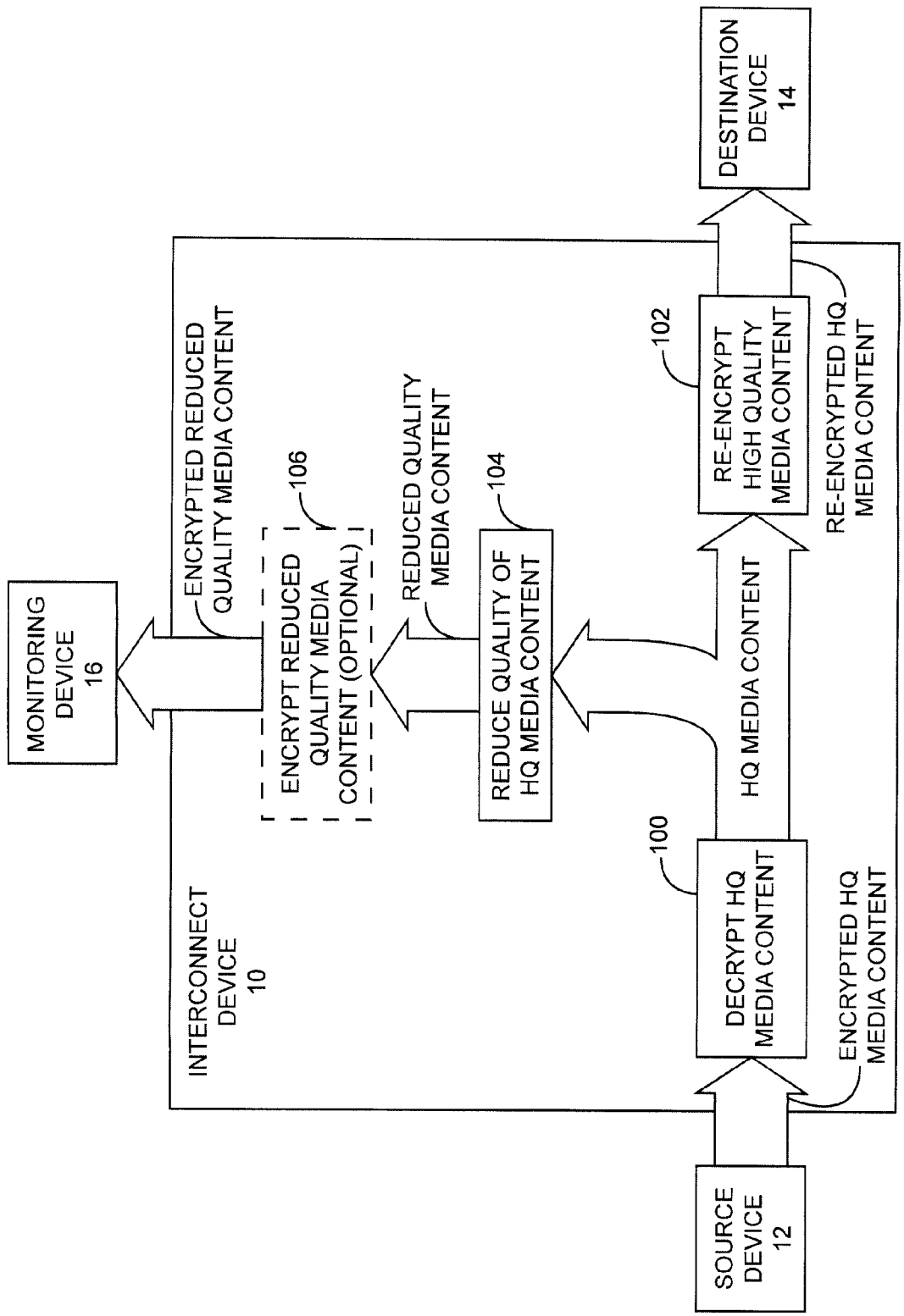
FIG. 1 is a logical representation of an interconnect device according to one embodiment of the present invention.

The present invention is particularly beneficial when delivering high quality media content that is protected by one or more digital rights management (DRM) restrictions, which require the high quality versions of the media content to be delivered between DRM compliant media interfaces. For example, high quality media content that is protected by high-bandwidth digital content protection (HDCP) can only be delivered between HDCP-compliant media interfaces, such as digital visual interfaces (DVIs) and high-definition multimedia interfaces (HDMIs), of two devices without violating the DRM restrictions afforded by HDCP. With reference to FIG. 1, the present invention provides an interconnect device 10 that securely delivers high quality media content that is associated with one or more rights management restrictions from a source device 12 to a destination device 14, such as a display device. While delivering the high quality media content to the destination device 14 in compliance with the DRM restrictions, the interconnect device 10 is also able to generate reduced quality media content from the high quality media content for delivery to a monitoring device 16 to facilitate remote monitoring, again while complying with the DRM restrictions.

Continuing with FIG. 1, the source device 12 may include a rights management (RM) compliant media interface from which encrypted high quality (HQ) media content can be delivered to the destination device 14, which also has an RM compliant media interface. For the present invention, the interconnect device 10 resides between the source device 12 and the destination device 14, and as will be described further below, provides media interfaces, which are compliant with the necessary RM restrictions, for connecting to the RM compliant interfaces of the source device 12 and destination device 14. The media interfaces of the interconnect device 10 and the respective media interfaces of the source and destination devices 12, 14 are generally able to communicate with each other to verify that they are compliant interfaces in order to allow high quality media content to be delivered from the source device 12 to the interconnect device 10, as well as from the interconnect device 10 to the destination device 14. Generally, the high quality media content is encrypted based on an RM restriction at the source device 12 prior to being delivered to the interconnect device 10. The interconnect device 10 will receive the encrypted HQ media content via the appropriate compliant media interface, and decrypt the protected media content (block 100) to recover the unencrypted HQ media content. The interconnect device 10 should be designed such that the HQ media content is securely maintained, and is not accessible per the requisite RM restrictions.

The HQ media content is re-encrypted (block 102) to create re-encrypted HQ media content for delivery to a compliant RM media interface of the destination device 14. Notably, the encryption provided by the source device 12 to generate the encrypted HQ media content may use the same or different keys or encryption algorithm as that of the interconnect device 10 when re-encrypting the HQ media content. Thus, the re-encrypted HQ media content delivered to the destination device 14 from the interconnect device 10 may be encrypted in a different fashion than the encrypted HQ media content delivered to the interconnect device 10 from the source device 12. Those skilled in the art will recognize different ways in which the interconnect device 10 may interact with the respective source and destination devices 12, 14 to exchange the necessary keys or encryption information to facilitate the requisite decryption and encryption of the HQ media content.

The interconnect device 10 acts as a repeater when delivering HQ media content from the source device 12 to the destination device 14. As such, the interconnect device 10 acts much like a cable or other relay device from the perspective of the source device 12 and the destination device 14. However, the interconnect device 10 is also capable of generating a reduced quality version of the HQ media content, which is referred to herein as the "reduced quality media content," for delivery to a monitoring device 16 to facilitate remote monitoring of the HQ media content being delivered to the destination device 14.

The encrypted HQ media content received from the source device 12 is decrypted by the interconnect device 10 to recover the unencrypted HQ media content, as described above. In addition to being re-encrypted and delivered to the destination device 14, the HQ media content is also processed in a manner to reduce the quality of the HQ media content (block 104). Reducing the quality of the HQ media content may involve decreasing resolution, increasing compression rates, extracting certain content, or modifying the HQ media content from its original form. The essence of the quality reduction is to modify the HQ media content to a form that can be delivered with little or no restriction to the monitoring device 16. For example, high definition content may be further compressed or downconverted from a resolution of 1920×1080 pixels or 1440×720 pixels to a resolution of 1280×480 pixels or lower. Further, the color information may be modified or the audio content removed. The ways in which to reduce the quality of the HQ media content are virtually unlimited.

The resulting reduced quality media content may be encrypted and delivered to the monitoring device 16 through any available communication means (block 106). Alternatively, the reduced media content may be delivered in an unencrypted form to the monitoring device 16, depending on the desires and capabilities of the monitoring device 16, as well as any RM restrictions on delivering the reduced quality media content.

Figure 2:
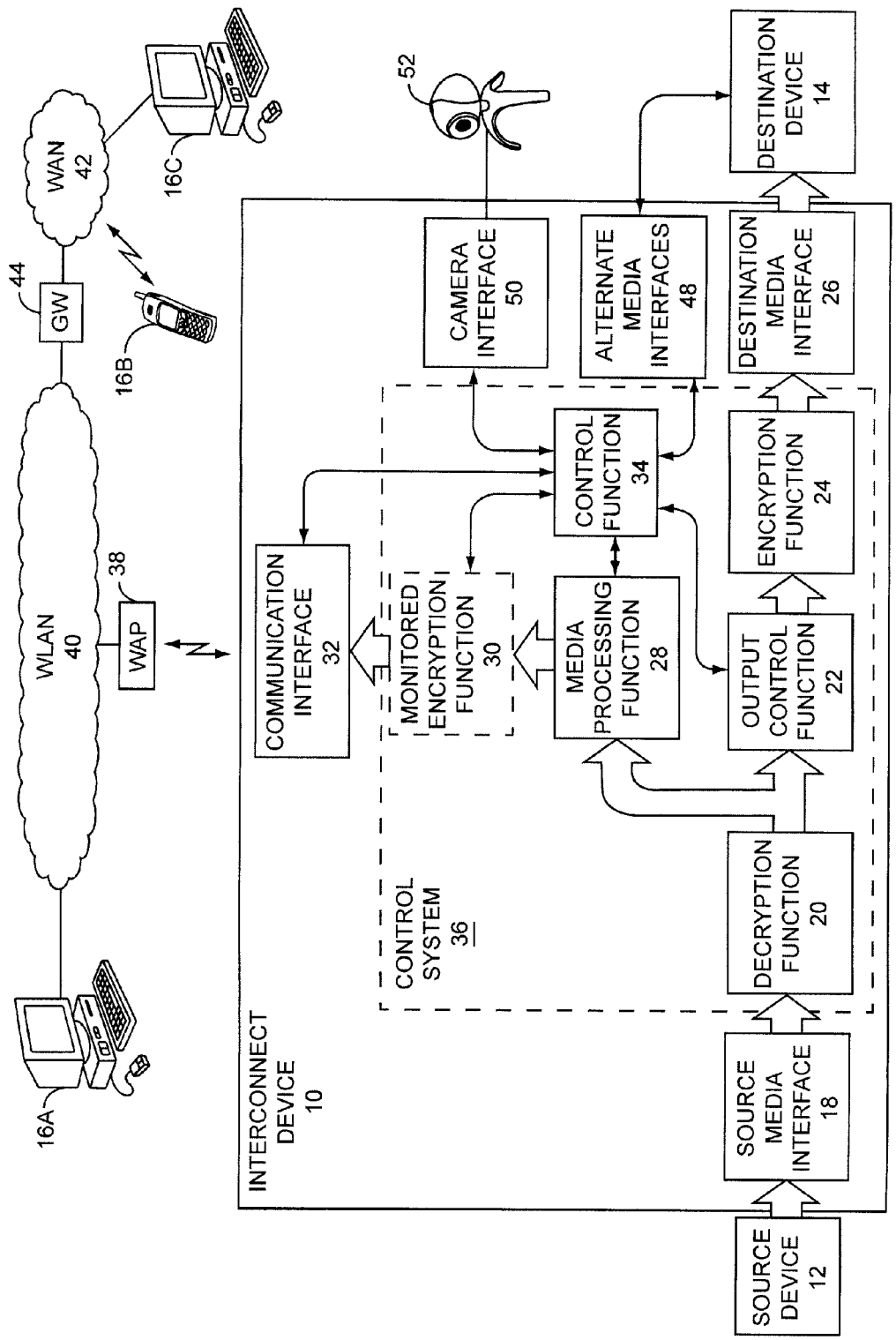
FIG. 2 is a block representation of an interconnect device and associated media environment according to a first embodiment of the present invention.

With reference to FIG. 2, a logical representation of the interconnect device 10 is provided in association with the source device 12, the destination device 14, and an associated communication environment. The interconnect device 10 has a source media interface 18, which is designed to connect through an appropriate cable or wireless connection to a RM compliant media interface of the source device 12. Through the source media interface 18, the interconnect device 10 will be able to provide any requisite negotiations with the RM compliant interface of the source device 12 or with the source device 12 itself to enable the delivery of HQ media content from the source device 12 to the interconnect device 10 in compliance with any requisite RM restrictions. Assuming the HQ media content is delivered in an encrypted format, the source media interface 18 will receive the encrypted HQ media content from the source device 12 and present it to a decryption function 20, which will decrypt the encrypted HQ media content. The decrypted HQ media content may pass through an output control function 22 to an encryption function 24, which will re-encrypt the decrypted HQ media content and present the re-encrypted HQ media content to a destination media interface 26. At this point, the re-encrypted HQ media content is sent to a complaint RM interface of the destination device 14.

Notably, the output control function 22 may be employed to control delivery of media content, including the HQ media content, to the destination device 14 in response to commands received from the monitoring device 16, as will be described further below. In a basic implementation, the output control function 22 may operate as a switch to selectively allow the HQ media content to pass to the encryption function 24 for re-encryption and ultimate delivery to the destination device 14 via the destination media interface 26.

For the present invention, the decrypted HQ media content provided from the decryption function 20 is also sent to a media processing function 28 when remote monitoring of the media content being delivered to the destination device 14 is desired. The media processing function 28 will process the HQ media content to effectively reduce the quality of the HQ media content to a level sufficient to comply with the RM restrictions associated with the HQ media content. In addition to ensuring compliance with delivering media content that is associated with a rights management restriction to a non-compliant device, such as the monitoring device 16, the HQ media content may be processed to provide a format or resolution that is readily transmitted to and able to be processed by the monitoring device 16.

As illustrated in FIG. 2, numerous monitoring devices 16A, 16B, 16C are provided. The media processing function 28 may reduce the quality of the HQ media content in different ways for each of the different monitoring devices 16A, 16B, 16C. After processing the HQ media content to generate the reduced quality media content, the media processing function 28 may pass the reduced quality media content to a monitored encryption function 30, wherein the reduced quality media content is encrypted. Alternatively, the media processing function 28 may pass the reduced quality media content directly to a communication interface 32 for delivery toward one or more of the monitoring devices 16A, 16B, 16C.

The various functions of the interconnect device 10 may be controlled by a control function 34, wherein the control function 34 and one or more of the decryption function 20, output control function 22, encryption function 24, media processing function 28, monitored encryption function 30, and the control function 34 are provided by an overall control system 36. The control system 36 is coupled to the source media interface 18, destination media interface 26, and communication interface 32.

The communication interface 32 may be configured to facilitate wired or wireless communications to enable delivery of the reduced quality media content, whether encrypted or unencrypted, to one or more of the monitoring devices 16A, 16B, 16C. As illustrated in FIG. 2, the communication interface 32 may be a wireless communication interface that facilitates wireless communications to an appropriate wireless access point (WAP) 38, which is coupled to a wireless local area network (WLAN) 40. As illustrated, a personal computer (monitoring device) 16A is coupled to the WLAN 40. The WLAN 40 is further connected to a wide area network (WAN) 42 through an appropriate gateway (GW) 44. The WAN 42 may support wired or wireless communications with a mobile terminal (monitoring device) 16B or another personal computer (monitoring device) 16C.

Figure 3:
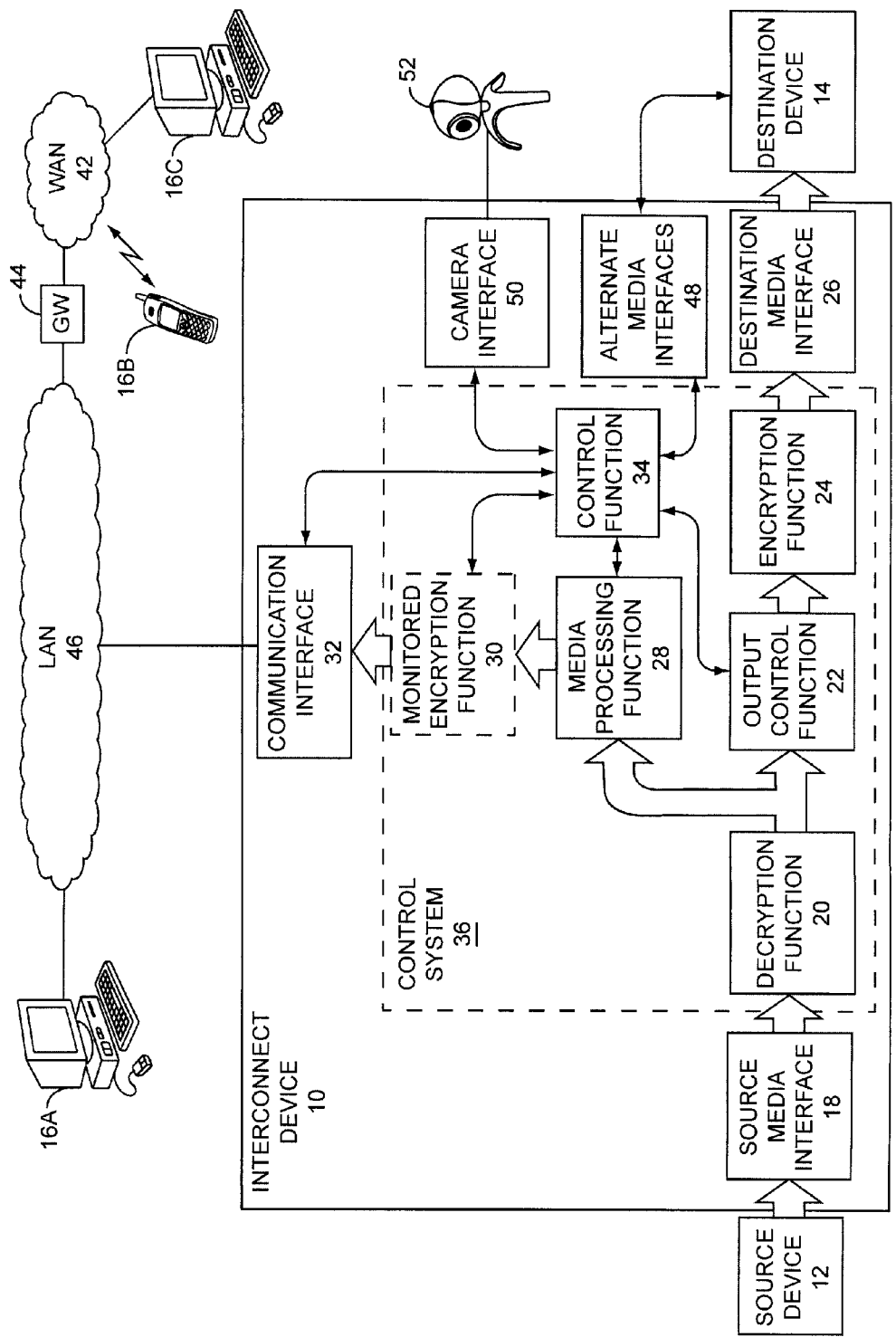
FIG. 3 is a block representation of an interconnect device and associated media environment according to a second embodiment of the present invention.

With reference to FIG. 3, the communication interface 32 is connected to a local area network (LAN) 46 through an Ethernet or like connection. The personal computer (monitoring device) 16A is directly coupled to the LAN 46, wherein the mobile terminal (monitoring device) 16B and personal computer (monitoring device) 16C are still connected to the WAN 42, which is coupled to the LAN 46 via the gateway 44.

In addition to being able to securely deliver HQ media content between the source device 12 and destination device 14 in compliance with RM requirements, as well as providing reduced quality media content to a monitoring device 16, there are numerous optional aspects of the present invention. As alluded to above, the interconnect device 10 may communicate in a bidirectional fashion with a monitoring device 16, wherein information may be provided by the control function 34 to the monitoring device 16, and the monitoring device 16 may provide information to the control function 34. The information provided to the monitoring device 16 may facilitate communications as well as provide information associated with the reduced quality media content, or the environment associated with the destination device 14. The information received from the monitoring device 16 may include configuration information to help configure the interconnect device 10 and control operation thereof.

In one embodiment of the present invention, the monitoring device 16 may provide instructions to the interconnect device 10 to cause the output control function 22 to prevent delivery of the HQ media content to the encryption function 24, and thus prevent delivery of the HQ media content from the destination media interface 26 to the destination device 14. Those skilled in the art will recognize that the output control function 22 may be implemented anywhere along the HQ media content stream between the source media interface 18 and the destination media interface 26. The essence of the output control function 22 is to effectively allow a remote party to prevent HQ media content, or any media content for that matter, from reaching the destination device 14.

Notably, the interconnect device 10 is able to pass high or low quality media content that is not associated with rights management restrictions from the source media interface 18 to the destination media interface 26, since all media content is not subject to rights management restrictions. As such, any media content delivered to the destination device 14 can be delivered via the communication interface 32 to the monitoring device 16 to allow a person to remotely monitor any type of media content being delivered to the destination device 14. Accordingly, the output control function 22 allows the person monitoring the media content being delivered to the destination device 14 to send an instruction to the interconnect device 10 from the monitoring device 16 to effectively stop delivery of any type of media content to the destination device 14.

To avoid circumvention of the interconnect device 10 through alternative media interfaces on the destination device 14, the interconnect device 10 may be provided with alternate media interfaces 48, which are capable of being connected to non-compliant media interfaces of the destination device 14. For example, if the destination media interface 26 is a DVI interface or HDMI interface, the destination media interface 26 will be connected to a DVI interface or HDMI interface of the destination device 14. However, the destination device 14 may include composite, S-Video, component, and coax interfaces, as well as secondary DVI or HDMI interfaces. The control function 34 and the alternate media interfaces 48 cooperate such that the supplemental media interfaces of the destination device 14 may be plugged into one or more alternate media interfaces 48 of the interconnect device 10. Once connected, the control function 34 is able to ensure that the alternate media interfaces 48 remain connected. If any of the alternate media interfaces 48 are disconnected from the destination device 14, in apparent circumvention of the primary media path provided by the destination media interface 26 and the RM compliant media interface of the destination device 14, a signal may be sent to the monitoring device 16 to provide an alert to indicate the activity associated with the respective interfaces of the interconnect device 10 and the destination device 14.

In many instances, media content that is acceptable to one individual is not acceptable to another. For example, if a parent located at the monitoring device 16 is monitoring the media content delivered to the destination device 14 via the interconnect device 10, certain content may be acceptable for a teenager, yet unacceptable for a preschooler. However, it is often difficult to determine who is actually listening to or viewing the media content provided to the destination device 14. As such, the present invention provides a camera interface 50, which may be directly or indirectly connected through wired or wireless means to a camera 52. The camera 52 may be aimed and focused on a viewing location that is normally occupied by viewers of or listeners to the destination device 14. The camera 52 can present still images or video of the viewing environment to the control function 34 via the camera interface 50. The control function 34 may continuously or periodically send still images or video to the monitoring device 16 via the communication interface 32 to allow the parent to determine who, if anyone, is viewing or listening to the media content being delivered to the destination device 14. Thus, if the media content that is objectionable to the preschooler is presented to only the teenager, no action is taken. However, if the preschooler is present when objectionable media content is being delivered to the destination device 14, the parent may send an instruction to the interconnect device 10 to stop delivery of the media content to the destination device 14.

To enable the monitoring device 16 to ensure proper functionality of the interconnect device 10, the control function 34 may be configured to provide periodic signals to the monitoring device 16 to indicate proper operation. As indicated above, the control function 34 may be configured to provide additional or alternative alerts in case of a malfunction or event that may circumvent the purpose or functionality of the interconnect device 10.

In many instances, a person may want to monitor numerous destination devices 14 at different locations at any given time. Accordingly, numerous interconnect devices 10, which connect different source and destination devices 12, 14, may be configured to send reduced quality media content to a given monitoring device 16. The monitoring device 16 may be configured to process the incoming reduced quality media content signals in various ways to facilitate monitoring. For example, in an Internet Protocol Television (IPTV) environment, the reduced quality media content signals may be mapped to different IPTV channels, wherein the monitoring device 16 is capable of receiving these different channels and displaying them in a variety of ways. The information from the different channels may be displayed simultaneously, wherein video-based media content is displayed in different blocks on a display of the monitoring device 16, such as that provided in a multi-picture or picture-in-picture configuration. Alternatively, the monitoring device 16 may be configured to cycle through the various channels associated with providing reduced quality media content, in a "slideshow" format, to enable substantially continuous monitoring of active channels.

The monitoring device 16 may be configured to automatically add new channels as they become active, and remove channels as they become inactive during the rotation for the slideshow or the windows provided in the multi-picture or picture-in-picture configurations. Again, the control function 34 may be configured to provide an appropriate alert when an interconnect device 10 becomes active and the corresponding reduced quality media content is mapped to an appropriate channel. Further, the monitoring device 16 and the control function 34 may negotiate with one another to identify an appropriate channel on which to provide the reduced quality media content. Alternatively, the reduced quality media content may simply be streamed to a given monitoring device 16, which will process the incoming media stream in a fashion analogous to that described above. Notably, the media stream may include audio, video, or a combination thereof, depending on the media content being delivered and how the media content is to be presented to the person monitoring the media content at the monitoring device 16. The reduced quality media content may be unicast to the monitoring device 16 or multicast to multiple monitoring devices 16, wherein active monitoring may take place at one or more monitoring devices 16 at any given time.

As noted, any type of media content provided to the destination devices 14, regardless of whether it is protected by rights management requirements, can be delivered to the monitoring device 16. Media content that is not subject to rights management restrictions need not be but can be reduced in quality prior to being delivered to the monitoring device 16. The extent of quality reduction may be based on bandwidth availability or limitations. If the original media content is not encrypted, it may simply pass through the decryption function 20 and the encryption function 24 without processing. Further, the media content may be formatted to facilitate delivery to and processing by the monitoring device 16. In addition to streaming content associated with audio and video, such as that provided by movie or television content, the media content may contain non-streaming content, such as web pages, digital images, and the like. Thus, virtually any type of media content may be monitored, while media content that is protected by associated rights management restrictions can be passed between the source device 12 and a destination device 14 in a secure fashion, while allowing a reduced quality version of the media content that is protected to be delivered to a monitoring device 16 for monitoring.

The source device 12 may take various forms, and is generally a playback device, such as a personal computer, personal video recorder, digital video recorder, set-top box, multimedia center, CD or DVD jukebox, video processor, audio/video receiver, and the like. The destination device 14 may be an intermediate media processor, receiver, switching entity, and the like, as well as a display device such as a computer monitor, television, projector, video monitor, and the like.

As noted, communications provided by the communication interface 32 may be wired or wireless. For wired communications, Ethernet, universal serial bus (USB), firewire, or like connections may be used. For wireless communications, local or cellular communications are available. For example, the communication interface 32 may be configured with a cellular interface to facilitate communications with a traditional cellular network. Perhaps in a more economical embodiment, the communication interface 32 would facilitate BlueTooth® or WLAN communications such as those set forth in the IEEE 802.11x standards. Those skilled in the art will recognize various techniques for facilitating communications in a wired or wireless manner between the interconnect device 10 and one or more monitoring devices 16. In a similar fashion, wired or wireless communications may be facilitated between the source device 12 and the source media interface 18, as well as between the destination device 14 and the destination media interface 26.

Those skilled in the art will recognize improvements and modifications to the preferred embodiments of the present invention. All such improvements and modifications are considered within the scope of the concepts disclosed herein and the claims that follow.

What is claimed is:

1. An device comprising:
    memory;
    a first media interface;
    a second media interface;
    a control system configured with the first media interface, the second media interface and the memory adapted to:
        receive encrypted high quality media content via the first media interface that is compliant with the at least one fights management restriction;
        decrypt the encrypted high quality media content to provide high quality media content;
        re-encrypt the high quality media content to provide re-encrypted high quality media content;
        deliver the re-encrypted high quality media content to a destination device via the second media interface where the re-encrypted high quality media content is compliant with the at least one fights management restriction;
        process the high quality media content to generate reduced quality media content;
        encrypt the reduced quality media content;
        deliver the reduced quality media content toward a monitoring device to facilitate remote monitoring of the high quality media content delivered to the destination device at the monitoring device while the re-encrypted high quality media content that is compliant with the at least one rights management restriction is delivered towards the destination device;
        receive an instruction to stop delivery of the high quality media content to the destination device;
        prevent delivery of the re-encrypted high quality media content toward the destination device; and
    a communication interface that is separate from the first and second media interfaces, where the reduced quality media content is delivered toward the monitoring device via the communication interface.

2. The device of claim 1 wherein the at least one rights management restriction is a High-Bandwidth Digital Content Protection (HDCP) restriction, and the first and second media interfaces are HDCP compliant media interfaces.

3. The device of claim 1 wherein a high quality media content is high definition video content.

4. The device of claim 1 wherein a quality of the reduced quality media content is less than that of the high quality media content.

5. The device of claim 1 wherein a resolution of the high quality media content is reduced to generate the reduced quality media content.

6. The device of claim 1 wherein a compression of the high quality media content is increased to generate the reduced quality media content.

7. The device of claim 1 wherein a portion of the high quality media content is removed to generate the reduced quality media content.

8. The device of claim 1 wherein the instruction is received from the monitoring device.

9. The device of claim 1 wherein the control system is further adapted to receive still images or video of an environment of the destination device and deliver the still images or video toward the monitoring device.

10. The device of claim 1 wherein the control system is further adapted to deliver toward the monitoring device alerts indicating that the device is operating properly.

11. The device of claim 1 further comprising a supplemental media interface, and the control system is further adapted to detect when the supplemental media interface is disconnected from a corresponding interface on the destination device and deliver toward the monitoring device an indication that the supplemental interface is not connected to the corresponding interface on the destination device.

12. The device of claim 1 wherein the control system is further adapted to deliver the reduced quality media content to a plurality of monitoring devices.

13. The device of claim 1 further comprising a wireless communication interface via which the reduced quality media content is delivered toward the monitoring device.

14. The device of claim 1 wherein the control system is further adapted to:
   receive alternate media content;
   deliver the alternate media content toward the destination device; and
   deliver the alternate media content toward the monitoring device.

15. The device of claim 14 wherein the control system is further adapted to modify the alternate media content prior to delivering the alternate media content toward the monitoring device.

16. The device of claim 1 wherein the reduced quality media content is streamed toward the monitoring device.

17. The device of claim 16 wherein the reduced quality media content is delivered via an Internet Protocol television (IPTV) channel toward the monitoring device.

18. A method comprising:
   receiving encrypted high quality media content that is compliant with at least one rights management restriction via a first media interface that is compliant with the at least one rights management restriction;
   decrypting the encrypted high quality media content to provide high quality media content;
   re-encrypting the high quality media content to provide re-encrypted high quality media content;
   delivering the re-encrypted high quality media content to a destination device where the re-encrypted high quality media content is compliant with the at least one rights management restriction, wherein the re-encrypted high quality media content is delivered to the destination device via a second media interface that is compliant with the at least one rights management restriction;
   processing the high quality media content to generate reduced quality media content;
   encrypting the reduced quality media content;
   delivering the reduced quality media content toward a monitoring device to facilitate remote monitoring of the high quality media content being delivered to the destination device at the monitoring device while the re-encrypted high quality media content that is compliant with the at least one rights management restriction is delivered to the destination device,
   receive an instruction to stop delivery of the high quality media content to the destination device;
   prevent delivery of the re-encrypted high quality media content toward the destination device; and
   wherein the reduced quality media content is delivered toward the monitoring device via a communication interface that is separate from the first and second media interfaces.

19. The method of claim 18 wherein a high quality media content is high definition video content.

20. The method of claim 18 wherein a quality of the reduced quality media content is less than that of the high quality media content.

21. The method of claim 18 wherein a resolution of the high quality media content is reduced to generate the reduced quality media content.

22. The method of claim 18 wherein a compression of the high quality media content is increased to generate the reduced quality media content.

23. The method of claim 18 wherein a portion of the high quality media content is removed to generate the reduced quality media content.

* * * * *